United States Patent [19]
Sommerfield

[11] 3,877,567
[45] Apr. 15, 1975

[54] CONVEYOR DRIVE SYSTEM

[76] Inventor: Ronald Sommerfield, 7 Drillen Ct., Commack, N.Y. 11580

[22] Filed: Dec. 3, 1973

[21] Appl. No.: 420,792

[52] U.S. Cl. ............................................. 198/189
[51] Int. Cl. ........................................ B65g 17/06
[58] Field of Search .......... 198/189, 191, 181, 168; 104/20, 25

[56] References Cited
UNITED STATES PATENTS

| | | | |
|---|---|---|---|
| 2,627,339 | 2/1953 | Whiting, Jr. | 198/189 |
| 3,379,300 | 4/1968 | Karr | 198/181 |
| 3,554,360 | 1/1971 | Bildsop | 198/189 |

FOREIGN PATENTS OR APPLICATIONS

| | | | |
|---|---|---|---|
| 846,031 | 8/1960 | United Kingdom | 198/181 |

*Primary Examiner*—James B. Marbert
*Attorney, Agent, or Firm*—Herbert L. Lerner

[57] ABSTRACT

In a conveyor of the type including a multiplicity of plate-like conveyor surface members each having a longitudinal axis and means loocated at the longitudinal axis thereof pivotally connecting each of the plate-like members to the other in series, means for supporting the plate-like members for sliding motion along a given path, and guide means extending along the given path and operatively engaging the plate-like members for guiding them along the given path, there is provided a conveyor drive system which includes abutment means extending from each of the plate-like members at a location thereof laterally spaced from the respective longitudinal axis thereof, driven endless chain means having a run located below the level of the abutment means and extending along a predetermined length of the given path, and a plurality of engagement members carried by the endless chain means at spaced intervals along the length thereof, the engagement members being movable upwardly into a position on the run wherein they are, respectively, engageable with the abutment means for pushing the same length of the run along the given path, the engagement members being movable upwardly and downwardly below the respective abutment members at the beginning and the end of the run.

7 Claims, 7 Drawing Figures

CONVEYOR DRIVE SYSTEM

The invention relates to a conveyor drive system and, more particularly, to such a system which drives a plurality of plate-like conveyor members or pallets successively along a predetermined path.

Conveyor drive systems have been known heretofore for driving conveyor members of the aforementioned type. A recently introduced example thereof is disclosed in U.S. Pat. No. 3,498,445 of R. J. Piper which issued Mar. 3, 1970. In this known drive system, an endless series of closely-coupled pallet members having a follower member extending downwardly therefrom are supported for sliding motion about a closed course. Guiding members extend along the center of the closed course and receive the follower member for guiding the travel of the pallet members about the closed course. A pair of parallel endless chains extend along a selected straight-section of the conveyor course, and drive members successively engaging the follower members to power the pallets about the course are positioned between the chains and located substantially within the confines of the links of the chain during horizontal movement. More specifically, the follower members are cylindrical in shape, and the drive members have arcuate portions formed therein conforming to a portion of the follower members for receiving the follower members in guiding engagement.

It has been found, however, that binding of the cylindrical follower members of this known conveyor drive system with the drive members occurs, particularly at the end of the horizontal run, as the path of the chain and the drive members begins to curve about the sprocket at the end of the run. The binding results in uneven disengagement of the drive members causing noise and extreme wearing (chain stretching) of components drive breakdown eventually results therefrom.

It is accordingly an object of the invention to provide a conveyor drive system which avoids the disadvantages of the heretofore known systems of this general type and which, more particularly, avoids the binding of the driving and the driven components thereof which may cause stopping of the conveyor. With the foregoing and other objects in view, there is provided, in accordance with the invention, in a conveyor of the type including a multiplicity of plate-like conveyor surface members each have a longitudinal axis and means located the longitudinal axis thereof pivotally connecting each of the plate-like members to the other in series, means for supporting the plate-like members for sliding motion along a given path, and guide means extending along the given path and operatively engaging the plate-like members for guiding them along the given path; a conveyor drive system comprising abutment means extending from each of the plate-like members at a location thereof laterally spaced from the respective longitudinal axis thereof, driven endless chain means having a run located below the level of the abutment means and extending along a predetermined length of the given path, and a plurality of engagement members carried by the endless chain means at spaced intervals along the length thereof, the engagement members being movable upwardly into a position on the run wherein they are, respectively, engageable with the abutment means for pushing the same the length of the run along the given path, the engagement members being movable downwardly below the respective abutment members at the end of the run.

In accordance with another feature of the invention, guide means are disposed along the run for maintaining the engagement members at a level at which they are engageable with the abutment means.

In accordance with a further feature of the invention, the guide means comprise a substantially horizontal track underlying the path of travel of the engagement members along the run, and roller means are journalled on the engagement members and rollingly guided on the track along the path.

In accordance with yet another feature of the invention, the guide means comprise a substantially horizontal track underlying the path of travel of the engagement members along the run for guiding the engagement members along the path.

In accordance with an added feature of the invention, the track has a section declining from the horizontal at the end of the run, the engagement members being guidable along the declining section out of engagement with the abutment means.

In accordance with an additional feature of the invention, the abutment means comprise drive lugs secured to the underside of respective plate-like conveyor surface members and have a substantially vertical abutment surface at the trailing end thereof in direction of travel of the plate-like members along the given path, and the engagement members comprise drive dogs having a corresponding surface, respectively, pivotable into engagement with the abutment surface of the drive lugs.

In accordance with a concomitant feature of the invention, the endless chain means comprise a pair of parallel endless chains, each of the chains being located at opposite sides and below the path of travel of the engagement members along the run.

In accordance with another feature of the invention, the endless chains comprise a multiplicity of links connected one to another by respective link pins, the engagement members being pivotally connected to respective extensions of the link pins of adjacent links of the parallel chains.

In accordance with a further feature of the invention, the guide means comprise a substantially horizontal track section underlying the path of travel of the engagement members along the run and a track section declining from the horizontal at the end of the run, the engagement members being substantially L-shaped and being pivoted on the extensions of the link pins at an end of one leg thereof and having roller means journalled at the other end of the one leg and guidingly supported on the track so that the other leg of the engagement members is in abutting engagement with the abutment means in the path of travel thereof along the substantially horizontal track section and is pivotally guided out of engagement with the abutment means along the declining section thereof.

In accordance with an additional feature of the invention, the engagement members are formed with a transverse bore intermediate the pivot and the journalled roller thereof, and another extension of link pins is located adjacent to the pivot link pin extension, the other link pin extension passing through the bore and having a diameter smaller than the diameter of the bore whereby the pivot range of the respective engagement members, about the respective pivot link pin extensions is limited to the difference in diameters of the respective other link pin extension and the bore through which it passes.

Although the invention is illustrated and described herein as embodied in conveyor drive system, it is nevertheless not intended to be limited to the details shown since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
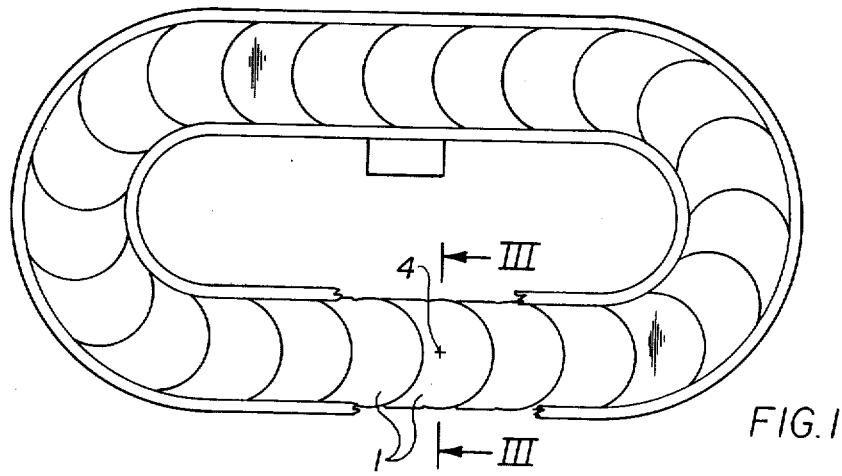
FIG. 1 is a diagrammatic top plan view of a conveyor having a conveyor drive system according to the invention.
Figure 2:
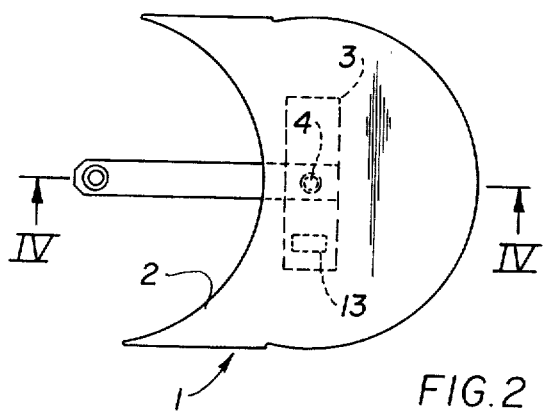
FIG. 2 is an enlarged top plan of one of the plate-like conveyor surface members of the conveyor of FIG. 1.
Figure 3:
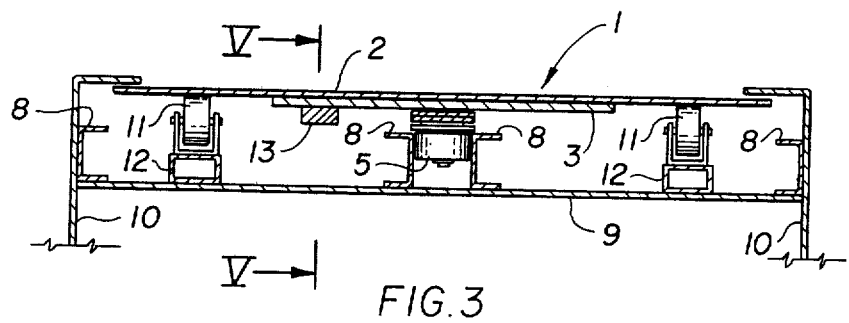
FIG. 3 is an enlarged cross-sectional view of FIG. 1 taken along the line III—III in the direction of the arrows.
Figure 4:
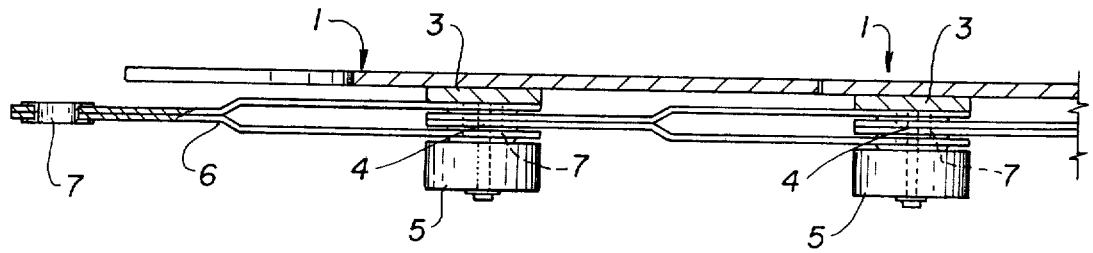
FIG. 4 is a longitudinal sectional view of FIG. 2 taken along the line IV—IV in the direction of the arrows.

Referring now to the drawing, and first, particularly to FIG. 1 thereof, there is shown therein a conveyor of the type having a multiplicity of plate-like conveyor surface members or pallets 1, the specific construction of which is shown more fully in FIGS. 2, 3 and 4. Conveyors of the type shown in FIG. 1 are employed for displaying and recirculating articles, generally of baggage, in a claim area but may also be employed, when suitably modified, as a moving sidewalk for moving people. Such conveyors have been known heretofore, for example, from U.S. Pat. Nos. 3,314,517; 3,379,300; 3,399,758 and 3,493,097 to W. F. Karr, from U.S. Pat. No. 3,395,648 to W. F. Karr and S. LeVine and from the aforementioned U.S. Pat. Nos. 3,498,445 and 3,552,540 both to R. J. Piper.

As shown in FIG. 2, the pallet 1 has a surface plate 2 of conventional configuration, and may be constructed of steel or any other rigid material plate. A ledge 3, as shown in FIGS. 2, 3 and 4 is secured by any conventional means, such as screws, for example, transversely to the underside of the surface plate 2. A pivot pin 4 extends from the ledge and carries a horizontally rotatable follower roller 5, as shown in FIGS. 3 and 4. A forked link member 6 is secured to the ledge 3 so that the pivot pin 4 is fasteneable to the ledge 3 through the two forks of the link member 6 and through an opening 7 provided at the free end of the forked link member 6 of the next adjacent pallet 1, as shown particularly in FIG. 4.

As can be seen in FIG. 3, the roller 5 is guided between two channel members 8 that are secured to a transverse plate 9 which is, in turn, supported at both sides thereof by vertical channel members, also designated members 8. Top and side trim 10 are formed with a substantially right-angle bend at the upper ends so as to overlie the laterial edges of the pallet 1. This trim 10 is fastened to the outer channel members 8 by conventional means, such as screws.

At the lateral ends of the ledge 3, rollers 11 are suitably mounted in stirrups for rotary travel along respective rail members 12 that are mounted on the plate 9. Between the follower roller 5 and one of the rollers 11 there extends from the ledge 3 an abutment member or drive lug 13 which forms part of the novel conveyor drive system of the invention which is described more fully hereinafter with respect to FIGS. 5, 6 and 7.

Figure 5:
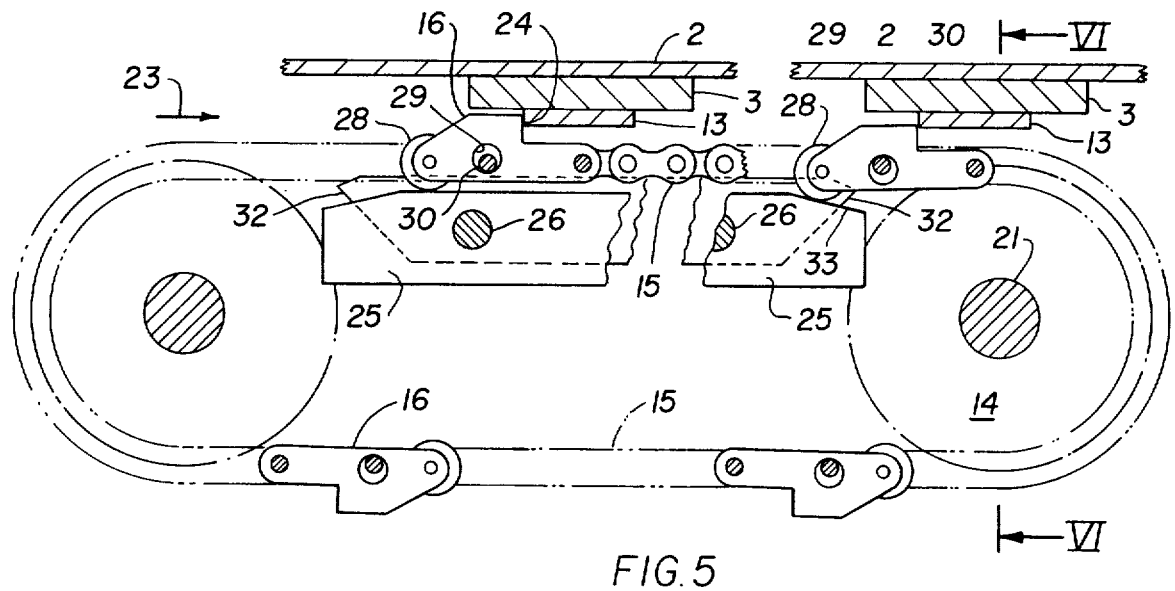
FIG. 5 is a longitudinal sectional view partly broken away of FIG. 3 taken along the line V—V in the direction of the arrows and showing the conveyor drive system of the invention.
Figure 6:
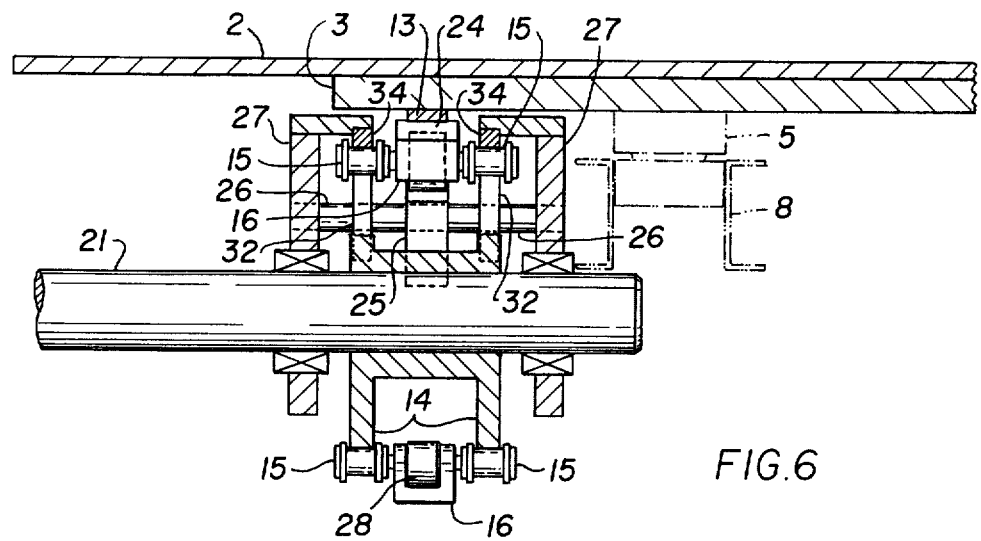
FIG. 6 is a cross-sectional view of FIG. 5 taken along the line VI—VI in the direction of the arrows.
Figure 7:
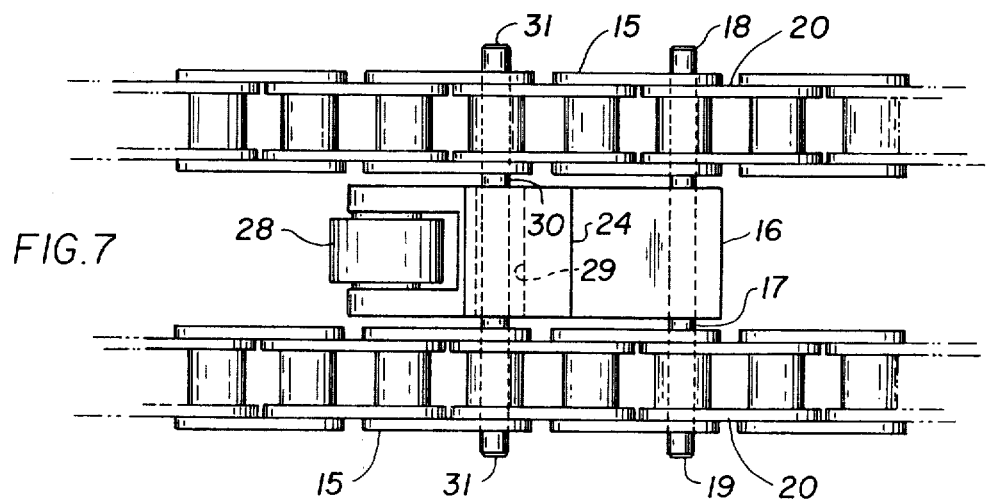
FIG. 7 is an enlarged fragmentary top plan view of FIG. 5 with the plate-like conveyor surface members removed and showing one of the drive dogs and its connection to the links of the parallel endless chains.

As can be seen in the longitudinal or elevational view of FIG. 5 and the fragmentary sectional view of FIG. 6, the drive system is of a dual caterpillar type having a duel set of sprockets 14 and a dual set of endless parallel chains 15 which carry several engagement members or drive dogs 16 which are pivotable about an extension 17 of respective pins 18 and 19 of selected links 20 of the chains 15.

A drive shaft 21 rotates the sprockets 15 and thereby causes the upper run 22 of the endless chains 15 to travel in the direction of the arrow 23. A respective drive dog 16, which is of L-shaped construction, has an engaging surface 24 on the shorter of the legs of the L with which it engages an abutment surface of a drive lug 13 of one of the plate-like conveying surface members 1 causing the latter to travel in the same direction as the arrow 23. To guide the drive dog 16 between the sprockets 14 at opposite ends of the loops of the endless chains 15, a horizontal track 25 is suitably secured by cross-pieces 26 to rigid upright support frame member 27. Near the end of the upper run of the dual chain drive 15, the track 25 has a decline 33 with respect to the horizontal section of the track 25. As can be seen in FIG. 5, the drive dog 16 which is pivoted to the link pin extension 17 at one end of the larger leg thereof is provided with a roller 28 at the other end thereof which rides on the track 25. As the drive dog passes the beginning of the declining section 33 of the track 25, the roller 28 begins to descend the decline and gradually withdraws the engaging surface 24 of the drive dogs 16 from the abutment surface of the drive lug 13 until the drive dog 16 drops sufficiently below the drive lug 13 a distance allowed on the pin 30 and is carried around the sprocket shown at the right-hand side of FIG. 5. This same disengagement procedure is identical to that occurring at the opposite end of the drive section for engagement purposes. The roller 28 contacts the track 25 on an incline until a proper horizontal height is reached. It is noted that the track 25 is a mirror-image identical in shape and size at both ends thereof. To prevent the drive dogs 16 from dangling freely from their respective pivots 17 along the lower run of the endless chains 15, the drive dogs 16 are formed with a transverse bore 29 (note FIG. 7 particularly) located intermediate the pivot 17 and the roller 28 thereof, through which a second extension 30 of link pins 31 passes. The second link pin extension 30 has a diameter that is less than that of the bore 29 through which it passes. The difference between those diameters establishes the limit of the pivoting range of the drive dog 16 about its pivot 17 and also limits the extent to which the drive dog 16 will be pivoted from the horizontal as it travels along the lower run of the chains 15.

In order to provide guidance for the chain links 20 of the endless chains 15, lower track members 32 are also mounted on the crosspieces 26, and upper track members 34 are also suitably secured to the vertical support frame members 27. The track members 32 are identical at both ends thereof.

I claim:

1. In a conveyor of the type including a multiplicity of plate-like conveyor surface members each having a longitudinal axis and means located at the longitudinal axis thereof pivotally connecting each of the plate-like members to the other in series, means for supporting the plate-like members for sliding motion along a given path, and guide means extending along the given path and operatively engaging the plate-like members for guiding them along the given path; a conveyor drive system comprising abutment means extending from each of the plate-like members at a location thereof laterally spaced from the respective longitudinal axis thereof, drive means located solely below said plate-like members comprising driven endless chain means having a run located below the level of said abutment means and extending along a predetermined length of the given path, and a plurality of engagement members carried by said endless chain means at spaced intervals along the length thereof, said engagement members being movable upwardly into a position on said run wherein they are, respectively, engageable with said abutment means for pushing the same the length of said run along the given path, said engagement members being movable downwardly below the respective abutment members at the end of said run, a guide means disposed along said run for maintaining said engagement members at a level at which they are engageable with said abutment means, said guide means comprising a substantially horizontal track underlying the path of travel of said engagement members along said run, and including roller means journalled on said engagement members and rollingly guided on said track along said path, said track having a cam section declining from the horizontal at the end of said run, said engagement members being guidable along said declining cam section out of engagement with said abutment means.

2. Conveyor drive system according to claim 1 wherein said abutment means comprise drive lugs secured to the underside of respective plate-like conveyor surface members and have a substantially vertical abutment surface at the trailing end thereof in direction of travel of said plate-like members along said given path, and said engagement members comprise drive dogs having a corresponding surface, respectively, pivotable into engagement with said abutment surface of said drive lugs.

3. Conveyor drive system according to claim 1 wherein said endless chain means comprise a pair of parallel endless chains, each of said chains being located at opposite sides and below the path of travel of said engagement members along said run.

4. Conveyor drive system according to claim 3 wherein said endless chains comprise a multiplicity of links connected one to another by respective link pins, said engagement members being pivotally connected to respective extensions of the link pins of adjacent links of said parallel chains.

5. Conveyor drive system according to claim 4 wherein said guide means comprise a substantially horizontal track section underlying the path of travel of said engagement members along said run and a track section declining from the horizontal at the end of said run, said engagement members being substantially L-shaped and being pivoted on said extensions of said link pins at an end of one leg thereof and having roller means journalled at the other end of said one leg and guidingly supported on said track so that the other leg of said engagement members is in abutting engagement with said abutment means in the path of travel thereof along said substantially horizontal track section, and is pivotally guided in and out of engagement with said abutment means along said inclining and declining section thereof.

6. Conveyor drive system according to claim 5 wherein said engagement members are formed with a transverse bore intermediate the pivot and the journalled roller thereof, and including another extension of link pins located adjacent to said pivot link pin extension, said other link pin extension passing through said bore and having a diameter smaller than the diameter of said bore whereby the pivot range of said engagement members, respectively, about said pivot link pin extensions thereof, respectively, is limited to the difference in diameters of the respective other link pin extension and said bore through which it passes.

7. Conveyor drive system according to claim 1 including guide means disposed along said rim for maintaining said engagement members at a level at which they are engageable with said abutment means, said guide means comprising a substantially horizontal track underlying the path of travel of said engagement members along said rim for guiding said engagement members along said path, said track having sections at the beginning and end of said rim respectively inclined to and declined from the horizontal, said engagement members being guidable along said inclined and declined sections respectively into and out of engagement with said abutment means.

* * * * *